United States Patent
Amelink et al.

(10) Patent No.: US 12,533,060 B2
(45) Date of Patent: Jan. 27, 2026

(54) HEMOGLOBIN MEASUREMENT BY RETINAL IMAGING

(71) Applicant: Nederlandse Organisatie voor toegepast-natuurwetenschappelijk onderzoek TNO, 's-Gravenhage (NL)

(72) Inventors: Arjen Amelink, Gouda (NL); Mathivanan Damodaran, 's-Hertogenbosch (NL); Johannes Fitzgerald De Boer, Amstelveen (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 1073 days.

(21) Appl. No.: 17/425,116

(22) PCT Filed: Jan. 23, 2020

(86) PCT No.: PCT/NL2020/050033
§ 371 (c)(1),
(2) Date: Jul. 22, 2021

(87) PCT Pub. No.: WO2020/153842
PCT Pub. Date: Jul. 30, 2020

(65) Prior Publication Data
US 2022/0104739 A1 Apr. 7, 2022

(30) Foreign Application Priority Data

Jan. 24, 2019 (EP) .................................... 19153456

(51) Int. Cl.
*A61B 5/1455* (2006.01)
*A61B 5/00* (2006.01)
*A61B 5/145* (2006.01)

(52) U.S. Cl.
CPC ........ *A61B 5/14555* (2013.01); *A61B 5/0059* (2013.01); *A61B 5/14546* (2013.01)

(58) Field of Classification Search
CPC .................................................... A61B 5/1455
See application file for complete search history.

(56) References Cited

PUBLICATIONS

European Patent Office, International Search Report in corresponding International Application No. PCT/NL2020/050033, dated Mar. 23, 2020 (3 pages).

(Continued)

*Primary Examiner* — Marjan Fardanesh
(74) *Attorney, Agent, or Firm* — Leydig, Voit & Mayer, Ltd.

(57) ABSTRACT

Methods and systems for measuring hemoglobin concentration ($c_{Hb}$). A retinal tissue having blood vessels is illuminated by light including two isosbestic wavelengths ($\lambda_1, \lambda_2$). The isosbestic wavelengths ($\lambda_1, \lambda_2$) correspond to isosbestic points where oxy- and deoxyhemoglobin ($HbIO_2$, Hb) have the same molar extinction coefficient. Measurements are collected of a plurality of backscattered reflection intensities ($I(\chi_b, \lambda_1)$, $I(x_t, \lambda_1)$, $I(\chi_b, \lambda_2)$, $I(x_x, X_2)$). Preferably, the measurements are spectrally resolved at least for the two isosbestic wavelengths ($\lambda_1, \lambda_2$) and position-resolved for at least a blood vessel location ($x_b$) coinciding with a selected blood vessel and a tissue location ($x_t$) coinciding with the retinal tissue without blood vessel. The hemoglobin concentration ($c_{Hb}$) can be calculated based on a combination of the measurements at the two isosbestic wavelengths ($\lambda_1, \lambda_2$).

15 Claims, 2 Drawing Sheets

(56) References Cited

PUBLICATIONS

Delori F.C., "Noninvasive Technique for Oximetry of Blood in Retinal Vessels," Applied Optics, vol. 27, No. 6, pp. 1113-1125 (Mar. 15, 1988).

US 12,533,060 B2

HEMOGLOBIN MEASUREMENT BY RETINAL IMAGING

CROSS-REFERENCE TO RELATED APPLICATIONS

This patent application is a U.S. National Phase of PCT International Application No. PCT/NL2020/050033, filed Jan. 23, 2020, which claims priority to European Application No. 19153456.9, filed Jan. 24, 2019, which are both expressly incorporated by reference in their entireties, including any references contained therein.

TECHNICAL FIELD AND BACKGROUND

The present disclosure relates to hemoglobin concentration measurement using retinal imaging.

Hemoglobin (Hb) concentration in blood is a metric used for many applications in the medical field, including anemia diagnosis and transfusion guidance. For example, Hb concentration can be expressed as a quantity (mass, weight, or particles) of hemoglobin per unit volume of blood. A typical strategy for determining Hb concentration is an invasive procedure where blood is drawn from an artery and sent to a laboratory for further analysis. This process is time-consuming, subject to operator error, and carries the risk of infection. Thus a need exists for a noninvasive technique that can rapidly and accurately predict Hb concentration in human tissues.

It is recognized that the retina provides a unique location in the human body with visual access to blood vessels. It is also recognized that, in principle, the attenuation of light due to the presence of Hb can be used to determine the concentration of Hb within a tissue volume using a non-invasive reflectance measurement. However, there are unknown variables which prevent practical application. For example, collected light may have passed several blood vessels of which the vessel density and their diameters are unknown. For these and other reasons, it is hitherto practically infeasible to relate a reflectance measurement on a tissue to an absolute concentration of Hb in the blood.

It is desired to overcome or alleviate obstacles which have hitherto prevented successful application of retrieving hemoglobin concentration in blood from retinal imaging.

SUMMARY

Aspects of the present disclosure relate to methods and systems for measuring hemoglobin concentration, i.e. quantity representing a sum total of oxy- and deoxyhemoglobin (HbO2, Hb) molecules per unit volume of blood. A retinal tissue having blood vessels is illuminated by light including at least two isosbestic wavelengths. The isosbestic wavelengths correspond to isosbestic points where oxy- and deoxyhemoglobin have the same molar extinction coefficient. Measurements are collected of a plurality of backscattered reflection intensities. Preferably, the measurements are spectrally resolved at least for the isosbestic wavelengths and position-resolved for at least a blood vessel location coinciding with a selected blood vessel and a tissue location coinciding with the retinal tissue without blood vessel. The hemoglobin concentration can be calculated based on a combination of the measurements at the isosbestic wavelengths. In preferred embodiments, as will be explained in further detail below, cancellation of unknown variables may be achieved particularly using two or more isosbestic wavelengths which are relatively close together, e.g. adjacent isosbestic points. As will also be explained, measurement error may be reduced using pairs isosbestic wavelengths at which the molar extinction coefficients differ significantly. Alternatively, or additionally, measurements may also be more accurate by selecting relatively large blood vessels. Most preferably, a so-called pigment packaging effect is included in the calculation.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
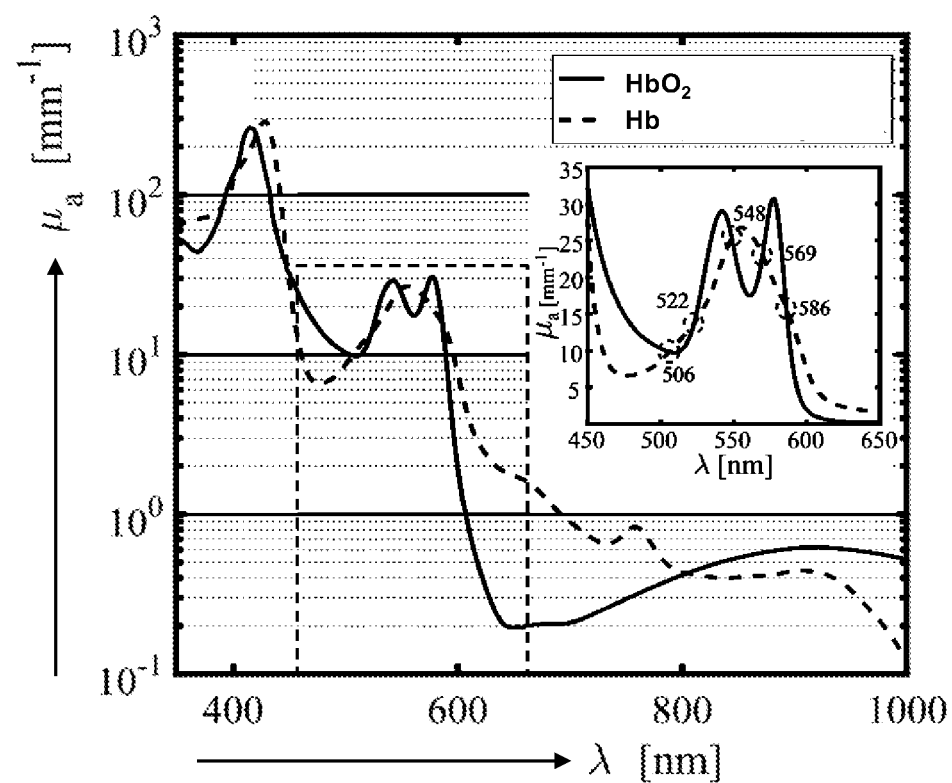
FIG. 1A illustrates an absorption spectrum of oxy- and deoxyhemoglobin from 350 nm to 1000 nm assuming a concentration of 150 mg of hemoglobin in 1 mL of blood. The inset shows the absorption spectrum from 450 nm to 650 nm. The absorption of these two types of hemoglobin is different for most wavelengths except for the isosbestic points (denoted by black dashed circles: 506 nm, 522 nm, 548 nm, 569 nm, and 586 nm in the inset) where the absorption depends on factors other than the 'oxygen saturation'.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step unless specified otherwise. Likewise, it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to the schematic and/or cross-section illustrations of possibly idealized embodiments and intermediate structures of the invention. In the description and drawings, like numbers refer to like elements throughout. Relative terms, as well as derivatives thereof, should be construed to refer to the orientation as then described or as shown in the drawing under discussion. These relative terms are for convenience of description and do not require that the system be constructed or operated in a particular orientation unless stated otherwise.

FIG. 1A shows an absorption spectrum of oxyhemoglobin ($HbO_2$)- and deoxyhemoglobin (Hb) having various isosbestic points, i.e. wavelengths where the absorption of oxy- and deoxyhemoglobin is equal. For example, in a relevant range between 500-600 nanometer, isosbestic points may be found at wavelengths 506 nm, 522 nm, 548 nm, 569 nm, and 586 nm. By using only measurements at isosbestic points, e.g. excluding anisosbestic measurements, dependency on oxygenation may be avoided.

Figure 1B:
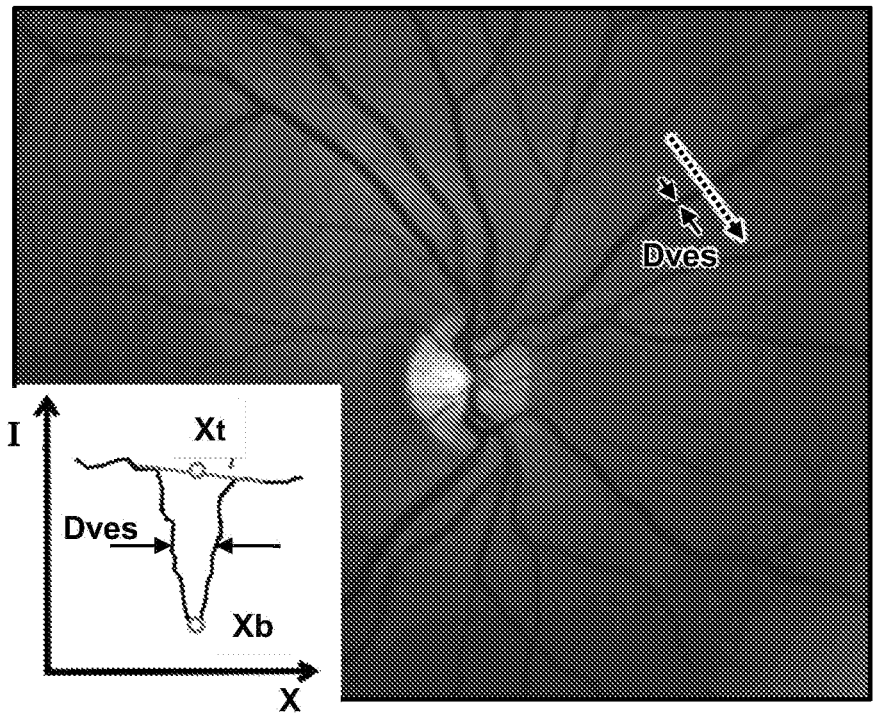
FIG. 1B illustrates an example fundus reflectance of the right eye of a healthy adult male at 570 nm recorded using a Fundus camera (Oxymap T1, Oxymap ehf., Iceland, fitted to a Topcon fundus camera, Topcon TRC 50-DX, Topcon corp., Japan). The inset shows a typical vessel absorption profile across a blood vessel (dotted line) in the fundus photo demonstrating a drop in the detected intensity at the blood vessel location ($x_b$) compared to the intensity at the tissue location ($x_t$).

FIG. 1B shows a typical fundus image of a healthy human eye obtained with 570 nm illumination. An example method for measuring the absorbance of blood at a particular blood vessel in the retina is shown in the inset of FIG. 1B where the intensity profile of the blood vessel (dotted line in FIG. 1B) is plotted as a function of the location on the retina. Although blood has a relatively high scattering coefficient, it also has a relatively high scattering anisotropy, which may typically result in a reduced scattering coefficient of ~1-2 $mm^{-1}$. Further, the reduced scattering coefficient of blood is relatively close to the reduced scattering coefficient of the surrounding tissue and about an order of magnitude smaller than the absorption coefficient of blood in the 450-650 nm wavelength range.

In retinal imaging, the measured intensity $I(x_o,\lambda)$ from a spatial location $x_o$ in the retina for a given illumination wavelength $\lambda$ depends on the incident illumination intensity distribution $I(x_i,\lambda)$ at the point $x_i$ and the backscattered reflectance function of the retina $R(x_o,x_i,\lambda)$. We consider a "diffuse" scheme where a broad beam illuminates an area around $x_i=x_o$ in the retina, and the camera collects from a small volume around a point $x_o$. Let $\bar{x}_o$ be the location of an averaged volume of tissue surrounding $x_o$ that contributes to the collected intensity $I(x_o,\lambda)$. The extent of volume averaging for any location concerning the spatial distribution of the optical properties at that location is determined by the incident illumination profile $I_i(x_i,\lambda)$ and the detection configuration. Under these conditions, we can write the measured intensity I as, $$I(x_o,\lambda)=\int I_i(x_i,\lambda)\cdot R(x_i,x_o,\lambda)\cdot dx_i = I_i(x_o,\lambda)\cdot R(\bar{x}_o, \lambda) \quad \text{Equation 1}$$

where the function R $(\bar{x}_o,\lambda)$ describes the reflectivity of the tissue averaged over a (small) tissue volume at the location $x_o$ due to scattering and absorption.

Let $x_b$ and $x_t$ denote the recorded locations at the centre of a blood vessel and in the adjacent tissue, respectively. Then the light collected from a tissue location $x_t$ can be written as, $$I(x_t,\lambda) \propto I_o(x_t,\lambda) R(\bar{x}_t,\lambda) = I_i(x_t,\lambda) R((\mu_s(\bar{x}_t,\lambda),p(\bar{x}_t,\theta,\lambda))) \quad \text{Equation 2}$$

where we have stated that $R(\bar{x}_t,\lambda)$ is a function of the average scattering coefficient $(\mu_s(\bar{x}_t,\lambda))$ of the volume of tissue around $x_t$ (denoted by $\bar{x}_t$) at the wavelength $\lambda$ and of the scattering phase function $(p(\bar{x}_t,\theta,\lambda))$ of the same tissue volume. We have assumed that there is no blood present in tissue volume $\bar{x}_t$ and that any other absorbing molecules within the tissue volume $\bar{x}_t$ in the neural retina have a negligible contribution to the reflected intensities. Similarly, the light collected from the centre of a blood vessel location $x_b$ is given by, $$I(x_b,\lambda) \propto I_o(x_b,\lambda)\cdot R(\bar{x}_b,\lambda)=I_i(x_b,\lambda)\cdot R(\mu_s(\bar{x}_b,\lambda),p(\bar{x}_b,\theta,\lambda),\mu_a(\bar{x}_b,\lambda))) \quad \text{Equation 3}$$

where we have stated that $R(\bar{x}_b,\lambda)$ is a function of the average scattering coefficient $\mu_s(\bar{x}_b,\lambda)$ of the volume of tissue around $\bar{x}_b$ (denoted by $\bar{x}_b$) at the wavelength $\lambda$, of the scattering phase function $p(\bar{x}_b,\theta,\lambda)$ of the same tissue volume and the effective absorption coefficient of the tissue volume containing the blood vessel $\mu_a(\bar{x}_b,\lambda)$.

We can now write the relative optical density $OD_\lambda$ of the tissue at the blood vessel location compared to the surrounding tissue at a particular wavelength as the logarithm of the ratio of tissue and blood vessel reflectivity at the same wavelength, i.e., $$OD_\lambda = \ln\left(\frac{I(x_t,\lambda)}{I(x_b,\lambda)}\right) = \ln\left(\frac{R(x_t,\lambda)}{R(x_b,\lambda)}\right) = \langle L_{\text{eff}}(\lambda)\rangle \cdot \mu_a(x_b,\lambda) + G(\lambda) \quad \text{Equation 4}$$

Here we have assumed that the incident light intensity was the same at both locations and that the attenuation of the reflected light due to the blood within $\bar{x}_b$ is governed by modified Beer-Lambert's law, with $\langle L_{\text{eff}}(\lambda)\rangle$ the effective path length of photons travelling through the probed volume before reaching the detector. The effective path length $\langle L_{\text{eff}}(\lambda)\rangle$ depends on the absorption and scattering properties of the probed volume. $G(\lambda)$ is a factor which accounts for any apparent increase or decrease in the ODs due to scattering and absorption differences within the volumes $\bar{x}_b$ and $\bar{x}_t$, e.g. due to pigmentation and due to the scattering properties of blood within the blood vessel compared to the surrounding tissue. Equation 4 assumes that all additional reflections occurring internally in the system due to optics and the stray reflections from the cornea are accounted for, e.g. by subtracting a reference measurement.

The absorption coefficient $\mu_a(\bar{x}_b,\lambda)$ of the blood is a function of saturation (S) of the blood (i.e., the fraction of the oxygenated hemoglobin concentration to the total concentration of hemoglobin), of the molar extinction coefficient of the blood ($\varepsilon_a(\lambda)$), and of the concentration of hemoglobin in the blood ($c_{Hb}$), i.e. sum total of absolute concentrations of oxy- and deoxyhemoglobin ($HbO_2$+Hb), and is given by, $$\mu_a(\bar{x}_b,\lambda)=c_{Hb}(S\cdot\varepsilon_a^{HbO2}(\lambda)+(1-S)\cdot\varepsilon_a^{Hb}(\lambda)) \quad \text{Equation 5}$$

The parameters $\varepsilon_a^{HbO2}(\lambda)$ and $\varepsilon_a^{Hb}(\lambda)$ are the molar extinction coefficients of oxy- and deoxyhemoglobin, respectively, and are known functions of wavelength as shown in FIG. 1A.

Monte Carlo simulations have suggested that in a fundus imaging device, the photons reaching the detector at the position corresponding to the location directly at the center of the blood vessel have predominantly transversed the blood vessel once (single pass). In this case, $\langle L_{\text{eff}}(\lambda)\rangle$ in Equation 4 becomes the blood vessel diameter $D_{ves}$, and we have:

$$OD_\lambda=D_{ves}\cdot c_{Hb}(S\cdot\varepsilon_a^{HbO2}(\lambda)+(1-S)\cdot\varepsilon_a^{Hb}(\lambda))+G(\lambda) \quad \text{Equation 6}$$

In some embodiments, an interesting effect may occur which is related to the fact that the absorbing hemoglobin molecules may not be homogeneously distributed through the blood vessel, but are contained in discrete packages (the red blood cells, RBCs) instead. This packaging of absorbing molecules is called pigment packaging, and the effect this has on the effective absorption has been studied extensively for the case of blood. As a result of this pigment packaging, the effective absorption coefficient within the blood vessel can be written, e.g. as:

$$\mu_a^{eff}(x_b, \lambda) = c_{Hb}(S \cdot \varepsilon_a^{HbO2}(\lambda) + (1-S) \cdot \varepsilon_a^{Hb}(\lambda)) \cdot \quad \text{Equation 7}$$

$$\left[ \frac{1 - e^{-D_{RBC} \cdot c_{Hb}(S \cdot \varepsilon_a^{HbO2}(\lambda) + (1-S)\varepsilon_a^{Hb}(\lambda))}}{D_{RBC} \cdot c_{Hb}(S \cdot \varepsilon_a^{HbO2}(\lambda) + (1-S) \cdot \varepsilon_a^{Hb}(\lambda))} \right]$$

where the last term in square brackets [ . . . ] may be considered a correction of equation 5, termed the pigment packaging factor. The pigment packaging factor here is based in part on the size $D_{RBC}$ [mm] which is the effective average diameter of RBCs, which is approximately 7-8 μm. An alternative version of the pigment packaging correction factor may also be used, see, e.g. "Effect of pigment packaging on diffuse reflectance spectroscopy of samples containing red blood cells, Finlay and Foster, Opt Lett 29:965-967 (2004)".

As shown in FIG. 1A, there are five isosbestic wavelengths in the 500-600 nm region: 506 nm, 522 nm, 548 nm, 569 nm, and 586 nm. Other isosbestic wavelengths of oxy- and deoxyhemoglobin outside this wavelength range are 390 nm, 420 nm and 804 nm. At the isosbestic wavelengths, $\varepsilon_a^{HbO2}(\lambda) = \varepsilon_a^{Hb}(\lambda)$ and Eq. 6, after incorporation of the pigment packaging effect, becomes simplified to:

$$OD_\lambda = D_{ves} \cdot c_{Hb} \cdot \varepsilon_a^{Hb}(\lambda) \left[ \frac{1 - e^{-D_{RBC} \cdot c_{Hb} \cdot \varepsilon_a^{Hb}(\lambda)}}{D_{RBC} \cdot c_{Hb} \cdot \varepsilon_a^{Hb}(\lambda)} \right] + G(\lambda) = \quad \text{Equation 8}$$

$$\frac{D_{ves}}{D_{RBC}} \cdot \left( 1 - e^{-D_{RBC} \cdot c_{Hb} \cdot S_a^{Hb}(\lambda)} \right) + G(\lambda)$$

From this, it may be recognized that taking a fundus photograph at a single isosbestic wavelength may be insufficient to determine the concentration of hemoglobin within the blood vessel, since the second term on the right hand side, $G(\lambda)$ is unknown. As stated previously, $G(\lambda)$ is a factor which accounts for any apparent increase or decrease in the ODs due to scattering and absorption differences within the volumes $\bar{x}_b$ and $\bar{x}_t$, e.g. due to pigmentation and due to the scattering properties of blood within the blood vessel compared to the surrounding tissue. Therefore, in a preferred embodiment, a fundus photograph at a second isosbestic wavelength is performed. We can then write:

$$OD_{\lambda_1} = \frac{D_{ves}}{D_{RBC}} \cdot \left( 1 - e^{-D_{RBC} \cdot c_{Hb} \cdot \varepsilon_a^{Hb}(\lambda_1)} \right) + G(\lambda_1) \quad \text{Equation 9}$$

$$OD_{\lambda_2} = \frac{D_{ves}}{D_{RBC}} \cdot \left( 1 - e^{-D_{RBC} \cdot c_{Hb} \cdot \varepsilon_a^{Hb}(\lambda_2)} \right) + G(\lambda_2)$$

To remove the unknown factor, it is desirable to select isosbestic wavelengths where $G(\lambda_1) = G(\lambda_2)$. This is the case for wavelengths where the scattering and absorption properties of blood are not too distinct, while the scattering as well as the absorption properties of the tissue surrounding the blood vessel should be as close as possible at the two isosbestic wavelengths. This desired condition may hold for wavelength combinations that are as close as possible to each other, such as preferably the adjacent pairs of isosbestic wavelengths 506 and 522 nm, 522 and 548 nm, 548 and 569 nm, or 569 and 586 nm. In this case, the difference between the ODs at the two isosbestic wavelengths may be considered only a function of the hemoglobin concentration, which can be written as:

$$OD_{\lambda_1} - OD_{\lambda_2} = \frac{D_{ves}}{D_{RBC}} \cdot \quad \text{Equation 10}$$

$$(\exp(-D_{RBC} \cdot c_{Hb} \cdot \varepsilon_a^{Hb}(\lambda_2)) - \exp(-D_{RBC} \cdot c_{Hb} \cdot \varepsilon_a^{Hb}(\lambda_1)))$$

In some embodiments, this equation is used to calculate the hemoglobin concentration $c_{Hb}$.

In other or further embodiments, Equation 10 can be approximated by:

$$c_{Hb} = \frac{OD_{\lambda_1} - OD_{\lambda_2}}{D_{ves} \cdot (\varepsilon_a^{Hb}(\lambda_1) - \varepsilon_a^{Hb}(\lambda_2))} \quad \text{Equation 11}$$

It is noted that Equation 11 can be used in some embodiments instead of Equation 10 to provide a simple though sometimes less accurate way of calculating the hemoglobin concentration $c_{Hb}$. For example, the concentration is calculated using the difference in measured optical densities $OD_{\lambda_1} - OD_{\lambda_2}$ at two isosbestic wavelengths $\lambda_1, \lambda_2$ divided by the selected vessel diameter $D_{ves}$, and divided by a difference of the molar extinction coefficients $\varepsilon_a^{Hb}(\lambda_1) - \varepsilon_a^{Hb}(\lambda_2)$ at the two isosbestic wavelengths $\lambda_1, \lambda_2$. For example, Equation 11 can be derived if we use the uncorrected Equation 5 instead of Equation 7. In other words, Equation 11 can be used for calculating the hemoglobin concentration e.g. in case the pigment packaging effect is less prominent.

We now determine further optimized wavelength combinations for estimating $c_{Hb}$ by performing an error propagation analysis on Eq. 10. For simplicity, in the error analysis which follows, we perform the error analysis based on the approximation of Eq. 11, i.e., $$\Delta c_{Hb} = \sqrt{\left(\frac{\partial c_{Hb}}{\partial D_{\lambda_1}}\right)^2 \cdot (\Delta OD_{\lambda_1})^2 + \left(\frac{\partial c_{Hb}}{\partial OD_{\lambda_2}}\right)^2 \cdot (\Delta OD_{\lambda_2})^2 + \left(\frac{\partial c_{Hb}}{\partial D_{ves}}\right)^2 \cdot (\Delta D_{ves})^2} \quad \text{Equation 12}$$

which is, $$\Delta c_{Hb} = \quad \text{Equation 13}$$

$$\frac{\sqrt{(\Delta OD^2_{\lambda_1} + \Delta OD^2_{\lambda_2}) \cdot D_{ves}^2 + (OD_{\lambda_1} + OD_{\lambda_2})^2 \cdot \Delta D_{ves}^2}}{D_{ves}^2 \cdot (\varepsilon_a^{Hb}(\lambda_1) - \varepsilon_a^{Hb}(\lambda_2))}$$

Equation 13 suggests that the difference in the extinction coefficients at the two isosbestic wavelengths should be as high as possible to reduce the uncertainty in hemoglobin concentration estimation, $\Delta c_{Hb}$. The error in the ODs are given by the underlying error in the measured intensities:

$$\Delta OD_\lambda = \sqrt{\left(\frac{\Delta I(x_t, \lambda)}{I(x_t, \lambda)}\right)^2 + \left(\frac{\Delta I(x_b, \lambda)}{I(x_b, \lambda)}\right)^2} \quad \text{Equation 14}$$

Figure 2A:
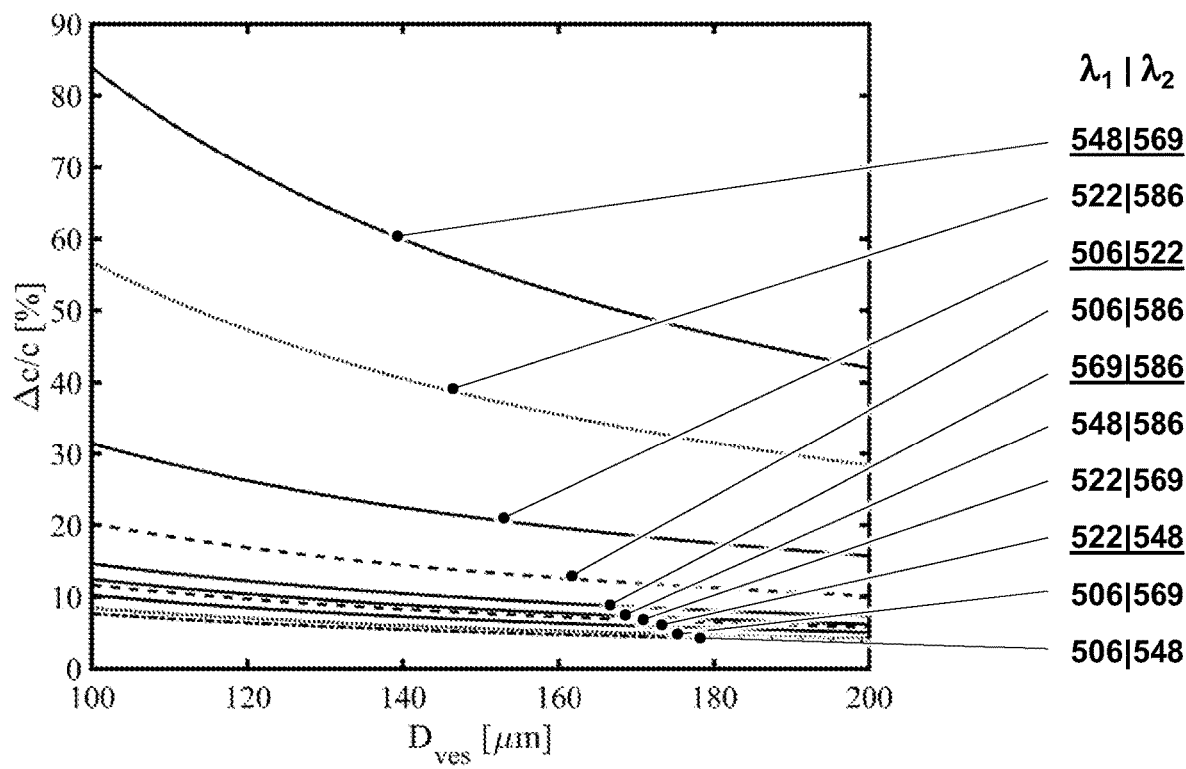
FIG. 2A illustrates error (%) on estimated concentrations for different wavelength combinations for 5% error on the intensities and $\Delta D_{ves}=20$ μm

For a fundus camera-based approach, assuming a 5% error on the measured intensities $I(x_t, \lambda)$ and $I(x_b, \lambda)$, and assuming $\Delta D_{ves} = 20$ μm, we plot the numerical solutions to Equation 13 for the 10 unique isosbestic wavelength combinations in the range 500-600 nm in FIG. 2A. Adjacent pairs of isosbestic wavelengths $\lambda 1 | \lambda 2$ are indicated by underlining.

FIG. 2A illustrates that certain combinations of isosbestic wavelengths do not allow accurate retrieval of $c_{Hb}$; for example, the combinations (548, 569 nm) and (522, 586 nm) may generally yield inaccurate results.

Figure 2B:
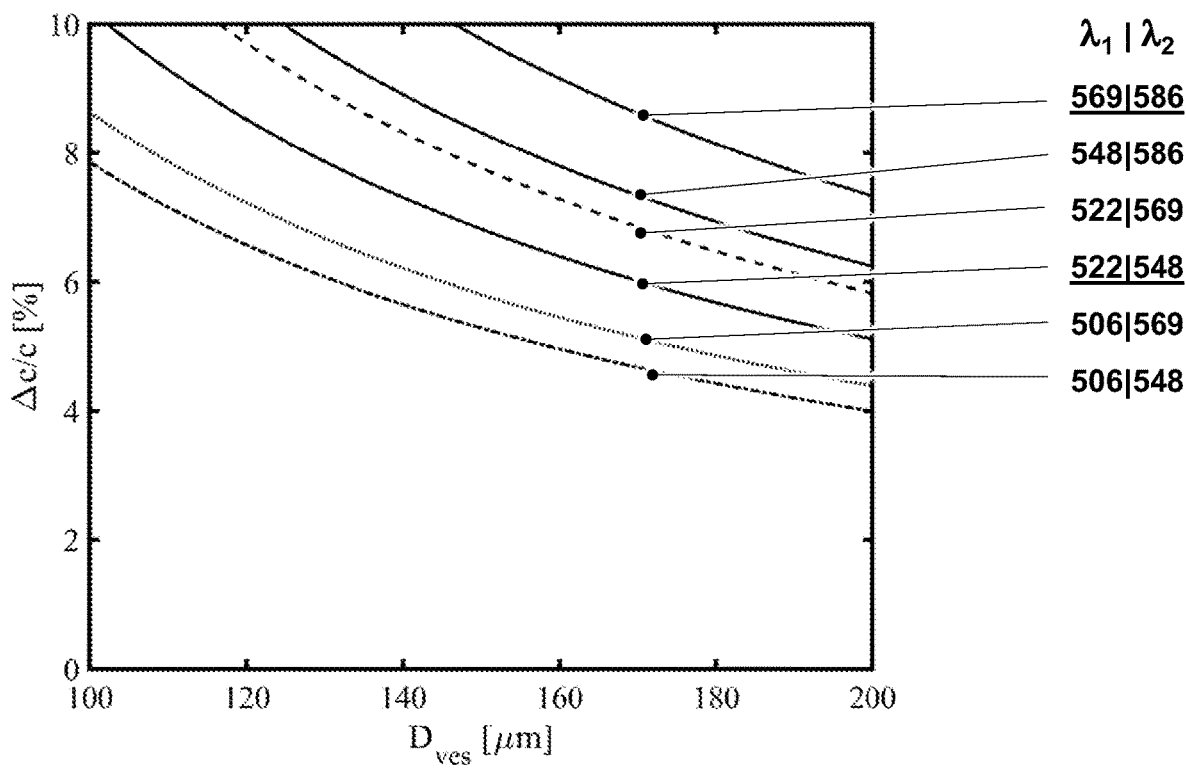
FIG. 2B illustrates wavelength combinations with an error (%) less than 10%.

FIG. 2B shows the same data as FIG. 2A but now zoomed in on the region where $\Delta c_{Hb}/c_{Hb}=0.1$. FIG. 2B shows the favourable combinations of isosbestic wavelengths; from the wavelength combinations that are very close to each other, i.e. 506 and 522 nm, 522 and 548 nm, 548 and 569 nm, or 569 and 586 nm, it appears that 522 and 548 nm is the most optimal combination, while, e.g. 569 and 586 may still provide good results, and even the combination 506 and 522 may be acceptable. If we relax the criterion for wavelength difference between the isosbestic points, also the non-adjacent pairs 506 and 548, or 548 and 586 can be used in principle, having a wavelength difference around forty nanometer. It may also be noted that more accurate results can be retrieved using relatively large blood vessels, e.g. with a diameter ($D_{ves}$) more than hundred micrometer, preferably, more than hundred-fifty micrometer, most preferably, two hundred micrometer or higher.

We conclude the optimal wavelength pair for hemoglobin concentration estimation in retinal blood vessels is 522 and 548 nm; other combinations of isosbestic wavelengths are also possible, but this pair has the optimal balance between achievable accuracy combined with a small difference in wavelength, thereby supporting the assumption that the scattering and absorption properties of surrounding the blood vessel are similar at these isosbestic wavelengths. For accurate retrieval of the hemoglobin concentration from a retinal image, it is recommended to include the pigment packaging effect (Eq. 10). The availability of appropriate, preferably narrow-band light sources and/or filters at these wavelengths may be used for practical applicability of this approach. As an example, the filters ET520/20 m and ET548/10× from Chroma can be used in combination with broader light sources such as LEDs. The extinction coefficient of blood varies only 2-3% as a function of saturation when using these filters, as can be calculated from a convolution of filter transmission and hemoglobin extinction for different saturation levels.

Various aspects and advantages as described herein can be embodied as methods and systems for measuring hemoglobin concentration ($c_{Hb}$).

Some embodiments may comprise illuminating a retinal tissue having blood vessels by light including two isosbestic wavelengths ($\lambda_1$, $\lambda_2$). For example, the isosbestic wavelengths ($\lambda_1$, $\lambda_2$) correspond to isosbestic points where oxy- and deoxyhemoglobin (HbO$_2$,Hb) have the same molar extinction coefficient ($\varepsilon_a^{HbO2}(\lambda_1)=\varepsilon_a^{Hb}(\lambda_1)$; $\varepsilon_a^{HbO2}(\lambda_2)=\varepsilon_a^{Hb}(\lambda_2)$). For example, the retinal tissue is illuminated by a suitable light source, optionally including wavelength filters to generate or pass a discrete number of wavelengths corresponding to the isosbestic wavelengths.

Some embodiments may comprise collecting measurements of a plurality of backscattered reflection intensities, e.g. $I(x_b,\lambda_1)$, $I(x_t,\lambda_1)$, $I(x_b,\lambda_2)$, $I(x_t,\lambda_2)$). Preferably, the measurements are spectrally resolved at least for the two isosbestic wavelengths ($\lambda_1$, $\lambda_2$). Preferably, the measurements are also position-resolved for at least a blood vessel location ($x_b$) coinciding with a selected blood vessel and a tissue location ($x_t$) coinciding with the retinal tissue without blood vessel. For example, the backscattered reflection intensities are measured using collection optics which may e.g. include projection optics and/or fiber optics.

Some embodiments may comprise calculating the hemoglobin concentration ($c_{Hb}$). As described herein, the calculation can be based on a combination of the measurements at the two isosbestic wavelengths ($\lambda_1$, $\lambda_2$).

In some preferred embodiments, the two isosbestic wavelengths ($\lambda_1$, $\lambda_2$) are less than fifty nanometer apart, preferably less than forty nanometer apart, most preferably less than thirty nanometer apart. The closer the wavelengths, the better the cancellation of the unknown factor G($\lambda$) discussed above.

In some preferred embodiments, the molar extinction coefficients at the respective two isosbestic wavelengths differ by at least a factor one and half, preferably at least a factor 1.7, or even more than a factor two. The more different the molar extinction coefficients, the less the error may be in the calculation as discussed above Based on these or other criteria, the two isosbestic wavelengths ($\lambda_1$, $\lambda_2$) are preferably a pair selected from 522 and 548 nm, 569 and 586 nm, 548 and 586 nm, 506 and 548 nm. In some embodiments, the two isosbestic wavelengths ($\lambda_1$, $\lambda_2$) comprise respective wavelengths of a pair of adjacent isosbestic points. Based e.g. on the error analysis, most preferably the two adjacent isosbestic wavelengths ($\lambda_1$, $\lambda_2$) are 522 and 548 nm.

In some embodiments, the calculation includes determining optical densities ($OD_{\lambda_1}$, $OD_{\lambda_2}$) of the selected blood vessel, compared to the tissue, at the two isosbestic wavelengths ($\lambda_1$, $\lambda_2$). In other or further embodiments, the optical densities are determined based on respective combinations, at each wavelength ($\lambda$), of the intensities ($I(x_b,\lambda)$, $I(x_t,\lambda)$) of the backscattered reflection from the blood vessel location ($x_b$) and the tissue location ($x_t$). For example, the optical density $OD_\lambda$ at a respective wavelength $\lambda$ for measured intensities $I(x_b,\lambda)$, $I(x_t,\lambda)$ at the blood vessel location ($x_b$) and the tissue location ($x_t$) can be calculated using a logarithm of the relative intensities, e.g. written as $$OD_\lambda = \ln\left(\frac{I(x_t, \lambda)}{I(x_b, \lambda)}\right)$$

In some embodiments, the calculation of the hemoglobin concentration ($c_{Hb}$) is based on a difference in the optical densities ($OD_{\lambda_1}-OD_{\lambda_2}$) of the selected blood vessel at the two isosbestic wavelengths ($\lambda_1$, $\lambda_2$). In other or further embodiments, the calculation of the hemoglobin concentration ($c_{Hb}$) is based on a difference in the optical densities ($OD_{\lambda_1}-OD_{\lambda_2}$) of the selected blood vessel at the two isosbestic wavelengths ($\lambda_1$, $\lambda_2$). In other or further embodiments, the calculation of the hemoglobin concentration ($c_{Hb}$) is based on the molar extinction coefficients at the two isosbestic wavelengths ($\lambda_1$, $\lambda_2$).

In some embodiments, a diameter ($D_{ves}$) of the selected blood vessel is more than hundred micrometer, preferably more than hundred-fifty micrometer, most preferably more than two hundred micrometer. Based e.g. on the error analysis, it may be appreciated that larger vessel diameters may suffer less error. Additionally, or alternatively, the pigment packaging effect may be less prominent.

In some embodiments, the calculation of the hemoglobin concentration ($c_{Hb}$) is based on a size ($D_{ves}$) of the selected blood vessel. In other or further embodiments, the size ($D_{ves}$) of the selected blood vessel is determined based on the position resolved measurements of the plurality of backscattered reflection intensities.

In some embodiments, the calculation of the hemoglobin concentration ($c_{Hb}$) is further based on a pigment packaging factor to correct for a pigment packaging effect of absorbing hemoglobin molecules not being homogeneously distributed throughout the retinal tissue but contained in a discrete package of the selected blood vessel.

In a preferred embodiment, the calculation of the hemoglobin concentration ($c_{Hb}$) is based on the relation of Equation 10. In another or further embodiment, the hemoglobin concentration ($c_{Hb}$) is approximated using a difference in measured optical densities ($OD_{\lambda_1} - OD_{\lambda_2}$) at the two isosbestic wavelengths ($\lambda_1, \lambda_2$) divided by a size of the selected vessel ($D_{ves}$) and divided by a difference of the molar extinction coefficients ($\varepsilon_a^{Hb}(\lambda_1) - \varepsilon_a^{Hb}(\lambda_2)$) at the two isosbestic wavelengths ($\lambda_1, \lambda_2$).

The methods described herein can be embodied by a computer readable medium comprising software instructions, which when executed by a computer or system, cause the execution of respective methods. The computer readable medium can also be part of a system, e.g. including a fundus camera or other handheld device for measuring the hemoglobin concentration.

In some embodiments, hand-held systems for retinal imaging can be envisaged. Smartphone add-ons for retinal imaging may also be developed. The availability of low-cost, handheld retinal imaging devices can facilitate the use of these devices in primary care settings. Such portable device could have wide applicability in various areas where rapid Hb measurements are required, such as in the emergency or operating room, in the back of an ambulance, in the battlefield, and in other resource-limited settings.

For the purpose of clarity and a concise description, features are described herein as part of the same or separate embodiments, however, it will be appreciated that the scope of the invention may include embodiments having combinations of all or some of the features described. Of course, it is to be appreciated that any one of the above embodiments or processes may be combined with one or more other embodiments or processes to provide even further improvements in finding and matching designs and advantages. It is appreciated that this disclosure offers particular advantages to hemoglobin measurement by retinal imaging, and in general can be applied for any measurement of analyte concentrations in accessible blood vessels.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A method for measuring hemoglobin concentration, the method comprising:
   illuminating a retinal tissue having blood vessels by light including two isosbestic wavelengths, wherein the isosbestic wavelengths correspond to isosbestic points where oxyhemoglobin and deoxyhemoglobin have a same molar extinction coefficient;
   collecting a plurality of backscattered reflection intensities, wherein the plurality of backscattered reflection intensities are:
      spectrally resolved at least for the two isosbestic wavelengths, and
      position-resolved for at least a blood vessel location coinciding with a selected blood vessel and a tissue location coinciding with the retinal tissue without a blood vessel; and
   calculating the hemoglobin concentration as a quantity representing a sum total of oxyhemoglobin and deoxyhemoglobin per unit volume of blood based on a combination of measurements of the plurality of backscattered reflection intensities at the two isosbestic wavelengths, each being position-resolved for the blood vessel location and the tissue location.

2. The method according to claim 1, wherein the calculating operation essentially excludes measurements at anisosbestic wavelengths.

3. The method according to claim 1, wherein the calculating the hemoglobin concentration is further based on a size of the selected blood vessel.

4. The method according to claim 1, wherein the calculating the hemoglobin concentration is further based on a pigment packaging factor to correct for a pigment packaging effect of absorbing hemoglobin molecules not being homogeneously distributed throughout the blood vessel, and instead being discretely contained in red blood cells.

5. The method according to claim 1, wherein a diameter of the selected blood vessel is more than a hundred micrometers.

6. The method according to claim 1, wherein the calculating the hemoglobin concentration is based on a difference in an optical density of the selected blood vessel at each of the two isosbestic wavelengths and the molar extinction coefficients at the two isosbestic wavelengths.

7. The method according to claim 1, wherein the calculating the hemoglobin concentration comprises using a difference in measured optical densities at the two isosbestic wavelengths divided by a size of the selected vessel and divided by a difference of the molar extinction coefficients at the two isosbestic wavelengths.

8. The method according to claim 1, wherein the calculating the hemoglobin concentration is based on the relation $$OD_{\lambda_1} - OD_{\lambda_2} = \frac{D_{ves}}{D_{RBC}} \cdot \left(e^{-D_{RBC} \cdot c_{Hb} \cdot \varepsilon_a^{Hb}(\lambda_2)} - e^{-D_{RBC} \cdot c_{Hb} \cdot \varepsilon_a^{Hb}(\lambda_1)}\right),$$

where
   $\lambda_1$ and $\lambda_2$ are the two isosbestic wavelengths,
   $OD_\lambda$ is an optical density of the selected blood vessel compared to the tissue, measured at wavelength $\lambda$,
   $D_{ves}$ is a diameter of the selected blood vessel,
   $D_{RBC}$ is an effective diameter of red blood cells in the selected blood vessel, $c_{Hb}$ is the hemoglobin concentration, and $\varepsilon_a^{Hb}(\lambda)$ is the molar extinction coefficient of hemoglobin or deoxyhemoglobin at wavelength $\lambda$.

9. The method according to claim 1, wherein the calculation includes determining optical densities of the selected blood vessel, compared to the tissue, at the two isosbestic wavelengths, wherein the optical densities are determined based on respective combinations, at each wavelength, of the intensities of the backscattered reflection from the blood vessel location and the tissue location.

10. The method according to claim 1, wherein the two isosbestic wavelengths are less than thirty nanometers apart.

11. The method according to claim 1, wherein the molar extinction coefficients at the respective two isosbestic wavelengths differ by at least a factor of one and a half.

12. The method according to claim 1, wherein the two isosbestic wavelengths are a pair selected from the group consisting of:
522 and 548 nm,
569 and 586 nm,
548 and 586 nm, and
506 and 548 nm.

13. The method according to claim 1, wherein the two isosbestic wavelengths are 522 and 548 nm.

14. A non-transitory computer readable medium comprising computer-executable instructions that, when executed by a computer, cause the computer to perform a method comprising:
receiving a plurality of backscattered reflection intensities resulting from illuminating a retinal tissue having blood vessels by light including two isosbestic wavelengths, wherein the isosbestic wavelengths correspond to isosbestic points where oxyhemoglobin and deoxyhemoglobin have a same molar extinction coefficient, wherein the plurality of backscattered reflection intensities are:
spectrally resolved at least for the two isosbestic wavelengths, and
position-resolved for at least a blood vessel location coinciding with a selected blood vessel and a tissue location coinciding with a retinal tissue without a blood vessel; and
calculating the hemoglobin concentration as a quantity representing a sum total of oxyhemoglobin and deoxyhemoglobin per unit volume of blood based on a combination of measurements of the plurality of backscattered reflection intensities at the two isosbestic wavelengths, each being position-resolved for the blood vessel location and the tissue location.

15. A system for measuring hemoglobin concentration, the system comprising:
a light source configured to illuminate a retinal tissue having blood vessels by light including two isosbestic wavelengths, wherein the isosbestic wavelengths correspond to isosbestic points where oxyhemoglobin and deoxyhemoglobin have a same molar extinction coefficient;
collection optics configured to receive a plurality of backscattered reflection intensities, wherein the plurality of backscattered reflection intensities are:
spectrally resolved at least for the two isosbestic wavelengths, and
position-resolved for at least a blood vessel location coinciding with a selected blood vessel and a tissue location coinciding with the retinal tissue without a blood vessel; and
a processor programmed to calculate the hemoglobin concentration based on a combination of measurements of the plurality of backscattered reflection intensities at the two isosbestic wavelengths, each being position-resolved for the blood vessel location and the tissue location.

* * * * *